United States Patent
Liu et al.

(10) Patent No.: US 10,223,247 B2
(45) Date of Patent: Mar. 5, 2019

(54) GENERATING PSEUDORANDOM TEST ITEMS FOR SOFTWARE TESTING OF AN APPLICATION UNDER TEST (AUT)

(71) Applicant: Red Hat, Inc., Raleigh, NC (US)

(72) Inventors: Hao Liu, Beijing (CN); Min Zhan, Beijing (CN); Luyao Huang, Beijing (CN)

(73) Assignee: Red Hat, Inc., Raleigh, NC (US)

( * ) Notice: Subject to any disclaimer, the term of this patent is extended or adjusted under 35 U.S.C. 154(b) by 204 days.

(21) Appl. No.: 15/202,108

(22) Filed: Jul. 5, 2016

(65) Prior Publication Data
US 2018/0011781 A1    Jan. 11, 2018

(51) Int. Cl.
*G06F 11/00* (2006.01)
*G06F 11/36* (2006.01)

(52) U.S. Cl.
CPC ...... *G06F 11/3684* (2013.01); *G06F 11/3696* (2013.01)

(58) Field of Classification Search
CPC ............. G06F 11/362; G06F 11/3684; G06F 11/3688; H04L 43/50; H04L 43/38; H04L 43/1813
See application file for complete search history.

(56) References Cited

U.S. PATENT DOCUMENTS

| | | | | |
|---|---|---|---|---|
| 5,455,832 A | * | 10/1995 | Bowmaster .... | G01R 31/318328 370/228 |
| 6,003,065 A | * | 12/1999 | Yan .......................... | G06F 9/50 709/200 |
| 6,018,805 A | * | 1/2000 | Ma ....................... | H04L 67/2819 709/230 |
| 6,067,639 A | | 5/2000 | Rodrigues et al. | |
| 6,421,822 B1 | * | 7/2002 | Pavela ................ | G06F 11/3664 714/E11.208 |
| 6,859,834 B1 | * | 2/2005 | Arora ..................... | G06F 9/5033 709/225 |
| 7,076,713 B1 | * | 7/2006 | Hess ..................... | G06F 11/263 714/741 |

(Continued)

OTHER PUBLICATIONS

Lu "Test Case Generation for Specification-Based Software Testing", Apr. 2003, IBM SWS, p. 1-10 (Year: 2003).*

(Continued)

*Primary Examiner* — Bryce P Bonzo
*Assistant Examiner* — Jeison C Arcos
(74) *Attorney, Agent, or Firm* — Withrow & Terranova, PLLC (57) ABSTRACT

Generating pseudorandom test items for software testing of an Application Under Test (AUT) is provided. In one example, a method comprises selecting an oracle of one or more oracles within a test provider directory structure, the oracle defining one or more logical paths each comprising one or more test conditions and an expected result. A pseudorandom test item having an initial state of empty is generated, and a logical path of the one or more logical paths is selected. The one or more test conditions of the logical path are translated into a constraint. Based on the constraint, a pseudorandom test input is generated and stored in the pseudorandom test item in association with the expected result corresponding to the logical path.

21 Claims, 7 Drawing Sheets

(56) References Cited

U.S. PATENT DOCUMENTS

| | | | | |
|---|---|---|---|---|
| 7,356,432 | B1* | 4/2008 | Lang | G06F 11/263 702/117 |
| 7,434,087 | B1* | 10/2008 | Singh | G06F 11/1443 714/4.11 |
| 7,694,181 | B2 | 4/2010 | Noller et al. | |
| 8,433,542 | B2 | 4/2013 | Kube et al. | |
| 8,479,164 | B2 | 7/2013 | Becker et al. | |
| 8,589,574 | B1* | 11/2013 | Cormie | G06F 17/30094 709/230 |
| 8,924,938 | B2 | 12/2014 | Chang et al. | |
| 2003/0005413 | A1* | 1/2003 | Beer | G06F 11/3664 717/125 |
| 2003/0028579 | A1* | 2/2003 | Kulkarni | G06F 8/30 718/100 |
| 2003/0208351 | A1* | 11/2003 | Hartman | G06F 11/3684 703/22 |
| 2004/0128584 | A1* | 7/2004 | Mandava | G06F 11/3676 714/38.14 |
| 2005/0288961 | A1* | 12/2005 | Tabrizi | G06Q 10/00 717/126 |
| 2006/0036895 | A1* | 2/2006 | Henrickson | G06F 11/1451 714/4.11 |
| 2006/0179363 | A1* | 8/2006 | LaBanca | G06F 11/2257 714/57 |
| 2006/0218446 | A1* | 9/2006 | Crawford | G06F 11/3688 714/38.14 |
| 2006/0253739 | A1 | 11/2006 | Godefroid et al. | |
| 2007/0022324 | A1* | 1/2007 | Chang | G06F 11/3688 714/38.14 |
| 2008/0320071 | A1* | 12/2008 | Hoskins | G06F 11/3688 709/202 |
| 2009/0165133 | A1* | 6/2009 | Hwang | G06F 21/53 726/22 |
| 2010/0192014 | A1* | 7/2010 | Mejdrich | G06F 11/263 714/32 |
| 2011/0022192 | A1* | 1/2011 | Plache | G05B 19/4188 700/28 |
| 2011/0145643 | A1 | 6/2011 | Kumar et al. | |
| 2011/0209131 | A1* | 8/2011 | Hohenstein | G06F 8/316 717/168 |
| 2013/0080999 | A1* | 3/2013 | Yang | G06F 11/3664 717/124 |
| 2013/0232245 | A1* | 9/2013 | Antosz | G06F 8/10 709/222 |

OTHER PUBLICATIONS

Wood "Automatic Test Generation Software Tools" Dec. 1992, Siemens, p. 1-22 (Year: 1992).*

IEEE, "IEEE Standard Glossary of Software Engineering Terminology" Sep. 1990, IEEE, p. 1-84 (Year: 1990).*

Poston, "Automatic Testing from Object Models" Sep. 1994, ACM, (Year: 1994).*

Ostrand, "A visual Test Development environment for GUI Systems" 1998, Siemens, p. 1-11 (Year: 1998).*

Memon, "Automated Test Oracles for GUIs", Sep. 2000, (Year: 2000).*

Memon, "Using a Goal-Driven Approach to generate test cases for GUIs", 1999, p. 1-10 (Year: 1999).*

Author Unknown, "Random testing," Wikipedia, Date Unknown, 4 pages, https://en.wikipedia.org/wiki/Random_testing.

Frendin, Carl, "Master thesis: Architecture of a Random Test Framework," Master of Science in Computer Engineering at KTH, Royal Institute of Technology, Date Unknown, 2 pages.

Groce, Alex et al., "Learning-Based Test Programming for Programmers," ISoLA'12 Proceedings of the 5th International conference on Leveraging Applications of Formal Methods, Verification and Validation: Technologies for Mastering Change, Part I, Oct. 2012, pp. 572-586.

Groce, Alex et al., "Random Testing and Model Checking: Building a Common Framework for Nondeterministic Exploration," ACM Workshop on Dynamic Analysis (WODA), Jul. 21, 2008, Seattle, Washington, pp. 22-28.

Ma, Lei et al., "GRT: Program-Analysis-Guided Random Testing," 2015 30th IEEE/ACM International Conference on Automated Software Engineering (ASE), Nov. 2015, IEEE, pp. 212-223.

Parizi, Reza Meimandi et al., "Towards a Framework for Automated Random Testing of Aspect-oriented Programs," SEDE, Jan. 2009, pp. 217-223.

\* cited by examiner

GENERATING PSEUDORANDOM TEST ITEMS FOR SOFTWARE TESTING OF AN APPLICATION UNDER TEST (AUT)

TECHNICAL FIELD

The examples relate generally to software testing of an Application Under Test (AUT) executing on a processor device, and, in particular, to mechanisms for generating input and expected results for performing random testing of an AUT.

BACKGROUND

Software testing of an Application Under Test (AUT) helps to minimize or eliminate the occurrence of operational errors (i.e., "bugs") prior to deployment of the AUT. Software testing may include the application of strategies such as equivalence partitioning or boundary value analysis by quality control engineers, or may employ random software testing techniques that generate random inputs based on an AUT specification.

SUMMARY

The examples include generating pseudorandom test items for software testing of an Application Under Test (AUT). Generating pseudorandom test items for software testing of an AUT executing on a processor device according to examples disclosed herein may be useful for automatically detecting software bugs by generating pseudorandom test inputs (i.e., test inputs that are generated according to random or pseudorandom algorithms, but that also satisfy specified constraints) in a manner that leverages the captured knowledge of quality control engineers with respect to functionality of the AUT.

In one example, a method for generating pseudorandom test items for software testing of an AUT is provided. The method includes selecting, by a computing device comprising a processor device, an oracle of one or more oracles within a test provider directory structure, the oracle defining one or more logical paths each comprising one or more test conditions and an expected result. The method further includes generating a pseudorandom test item having an initial state of empty. The method additionally includes selecting a logical path of the one or more logical paths, and translating the one or more test conditions of the logical path into a constraint. The method also includes generating, based on the constraint, a pseudorandom test input, and storing the pseudorandom test input in association with the expected result of the logical path in the pseudorandom test item.

In another example, a computing device is provided. The computing device includes a memory and a processor device coupled to the memory. The processor device is to select an oracle of one or more oracles within a test provider directory structure, the oracle defining one or more logical paths each comprising one or more test conditions and an expected result for generating pseudorandom test items for software testing of an AUT. The processor device is further to generate a pseudorandom test item having an initial state of empty. The processor device is also to select a logical path of the one or more logical paths, and translate the one or more test conditions of the logical path into a constraint. The processor device is additionally to generate, based on the constraint, a pseudorandom test input, and store the pseudorandom test input in association with the expected result of the logical path in the pseudorandom test item.

In another example, a computer program product for generating pseudorandom test items for software testing of an AUT is provided. The computer program product is stored on a non-transitory computer-readable storage medium, and includes instructions to cause a processor device to select an oracle of one or more oracles within a test provider directory structure. The oracle defines one or more logical paths each comprising one or more test conditions and an expected result. The instructions are further to cause the processor device to generate a pseudorandom test item having an initial state of empty. The instructions are also to cause the processor device to select a logical path of the one or more logical paths, and translate the one or more test conditions of the logical path into a constraint. The instructions are additionally to cause the processor device to generate, based on the constraint, a pseudorandom test input, and store the pseudorandom test input in association with the expected result of the logical path in the pseudorandom test item.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of operations. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Software testing of an Application Under Test (AUT) to detect and correct errors in operation (i.e., "bugs") is an important element of software development and maintenance. Software testing may be carried out manually by quality control engineers, who apply strategies such as equivalence partitioning or boundary value analysis, as non-limiting examples. However, use of these strategies by quality control engineers tend to be time-consuming, and may run the risk of introducing human bias into the testing.

One alternative is to employ random software testing techniques executed by a processor device. Because random software testing is unaffected by human bias, such techniques may be more effective than manual testing or manually written automatic testing in detecting bugs that are susceptible to neglect by human bias. A disadvantage of random software testing, though, is that the type of bugs that are detectable may be limited by the precision of the AUT specification used for testing. Moreover, generating a sufficiently precise AUT specification may be difficult for quality control engineers with limited coding skills.

The examples include generating pseudorandom test items for software testing of an Application Under Test (AUT). Generating pseudorandom test items for software testing of an AUT executing on a processor device according to examples disclosed herein may be useful for automatically detecting software bugs by generating pseudorandom test inputs (i.e., test inputs that are generated according to random or pseudorandom algorithms, but that also satisfy specified constraints) in a manner that leverages the captured knowledge of quality control engineers with respect to functionality of the AUT.

Figure 1:
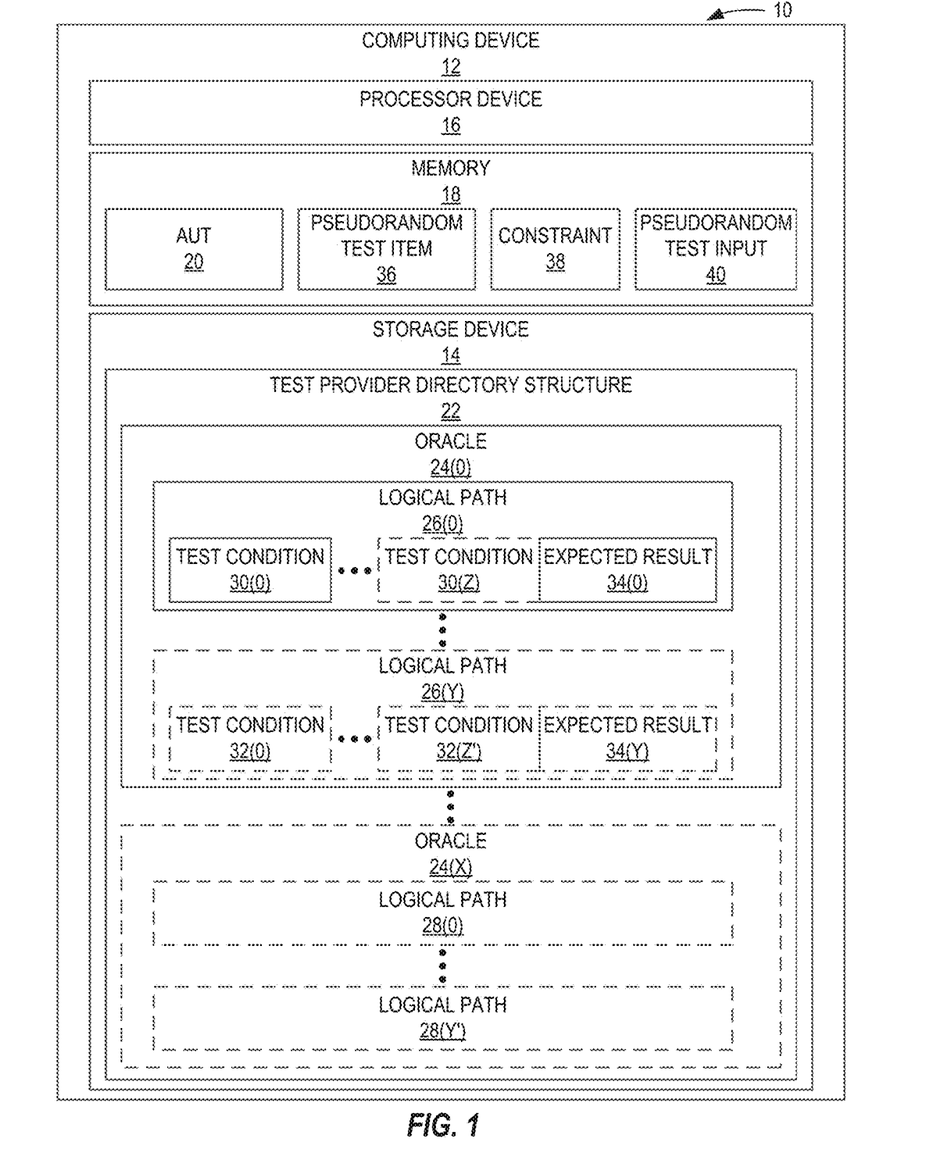
FIG. 1 is a block diagram of a system in which examples may be practiced.

In this regard, FIG. 1 is a block diagram of a system 10 in which examples may be practiced. The system 10 includes a computing device 12 to which a storage device 14 is attached. The computing device 12 includes a processor device 16 and a memory 18. The memory 18 may comprise a random access memory (RAM) such as a dynamic random access memory (DRAM), as a non-limiting example. The storage device 14 may comprise any combination of types of storage devices, such as, by way of non-limiting example, a hard disk drive (HDD), a solid state drive (SSD), or the like, and may comprise and/or provide a computer-readable medium. The storage device 14 may store executable code containing computer-executable instructions for performing operations described herein.

Stored in the memory 18 is an AUT 20, on which software testing is to be performed. To encode knowledge regarding the functionality of the AUT 20 to be tested, a test provider directory structure 22 is generated (e.g., by a quality control engineer, in some examples). The test provider directory structure 22 may comprise a file system directory or other appropriate data structure. The test provider directory structure 22 includes one or more oracles 24(0)-24(X), each of which may comprise a programming-language-like conditional syntax code (not illustrated). The oracles 24(0)-24(X) define one or more logical paths 26(0)-26(Y), 28(0)-28(Y'). In the example of FIG. 1, the logical paths 26(0)-26(Y) comprise one or more test conditions 30(0)-30(Z), 32(0)-32(Z') and corresponding expected results 34(0)-34(Y). The test conditions 30(0)-30(Z), 32(0)-32(Z') of the logical paths 26(0)-26(Y) specify conditionals that may be applied to an input to the AUT 20, and, in some examples, may be derived from the conditional syntax code of the oracles 24(0)-24(X). The expected results 34(0)-34(Y) specify outputs or responses expected to be generated by the AUT 20 if the corresponding logical paths 26(0)-26(Y) are followed. Note that although FIG. 1 only illustrates the test conditions 30(0)-30(Z), 32(0)-32(Z') and the expected results 34(0)-34(Y) for the logical paths 26(0)-26(Y), it is to be understood that the logical paths 28(0)-28(Y') also include test conditions and expected results analogous to those of the logical paths 26(0)-26(Y). Examples of the oracles 24(0)-24(X), and the logical paths 26(0)-26(Y), the test conditions 30(0)-30(Z), 32(0)-32(Z'), and the expected results 34(0)-34(Y) defined therein, are described in greater detail below with respect to FIGS. 4A and 4B.

To enable generation of test inputs that incorporate captured knowledge of the functionality of the AUT 20, the processor device 16 may access an oracle (e.g., the oracle 24(0)) of the one or more oracles 24(0)-24(X). The processor device 16 generates a pseudorandom test item 36 that has an initial state of empty. The processor device 16 may then select a logical path (e.g., the logical path 26(0)) of the one or more logical paths 26(0)-26(Y), 28(0)-28(Y'), and process each of the test conditions 30(0)-30(Z) of the selected logical path 26(0). In some examples, the logical path 26(3) is selected randomly from the one or more logical paths 26(0)-26(Y), 28(0)-28(Y'), while some examples may employ a pseudorandom or other alternate selection scheme or criteria.

To process the one or more test conditions 30(0)-30(Z) of the selected logical path 26(0), the processor device 16 translates the one or more test conditions 30(0)-30(Z) of the logical path 26(0) into a constraint 38, as described in greater detail below with respect to FIGS. 4A and 4B. The processor device 16 then generates a pseudorandom test input 40 based on the constraint 38 (for example, by generating an input value that satisfies the constraint 38 using a random or pseudorandom algorithm). The processor device 16 stores the pseudorandom test input 40 in association with the expected result 34(0) corresponding to the logical path 26(0) in the pseudorandom test item 36. Some examples may provide that these operations are repeated by the processor device 16 until all of the oracles 24(0)-24(X) have been processed.

Figure 2:
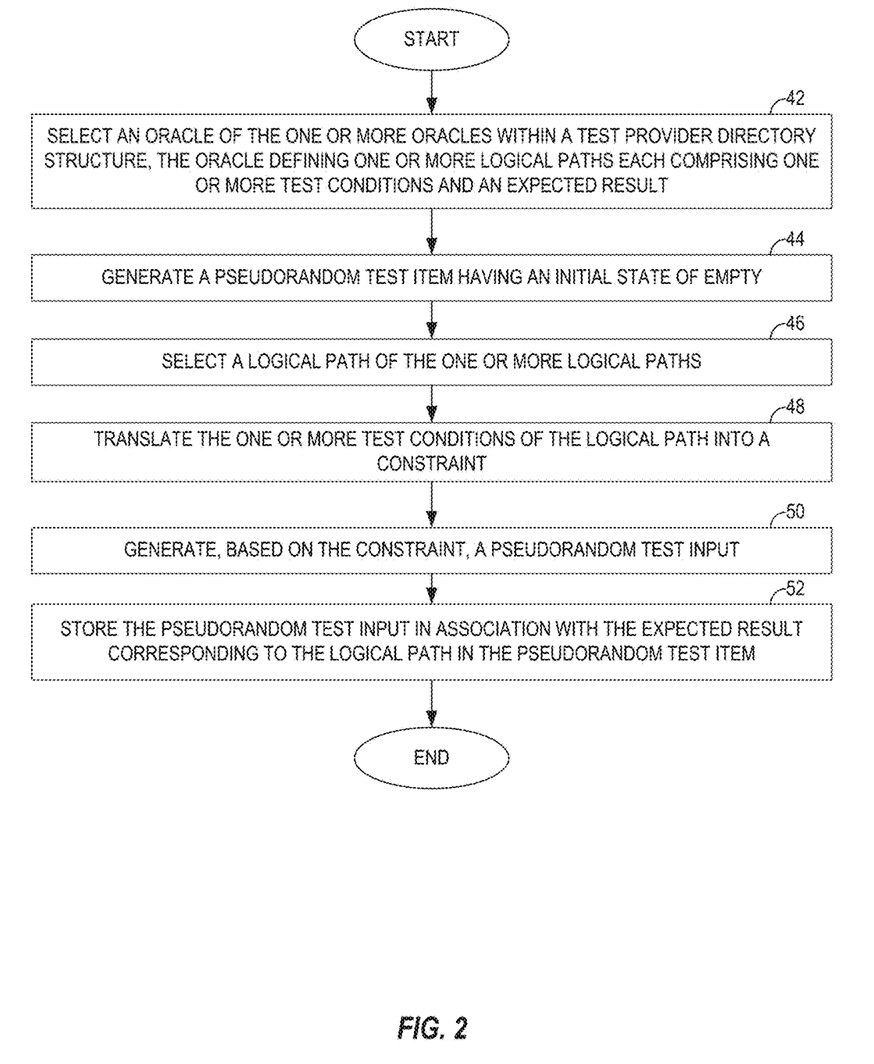
FIG. 2 is a flowchart of a method for generating pseudorandom test items for software testing of an Application Under Test (AUT) by the system of FIG. 1 according to one example.

To illustrate operations for generating pseudorandom test items 36 for software testing of the AUT 20 by the system 10 of FIG. 1 according to one example, FIG. 2 is provided. For the sake of clarity, elements of FIG. 1 are referenced in describing FIG. 2. Operations in FIG. 2 begin with the processor device 16 selecting an oracle 24(0) of the one or more oracles 24(0)-24(X) within the test provider directory structure 22, the oracle 24(0) defining one or more logical paths 26(0)-26(Y) each comprising one or more test conditions 30(0)-30(Z), 32(0)-32(Z') and an expected result 34(0)-34(Y) (block 42).

According to some examples, operations of block 42 for selecting the oracle 24(0) may be responsive to an expected result 34(0)-34(Y) of a pseudorandom test item 36 for a previously processed oracle 24(0)-24(X). For instance, an oracle 24(X) may be selected by the processor device 16 only if an expected result 34(0)-34(Y) of a previously processed oracle 24(0) is received in testing.

The processor device 16 then generates a pseudorandom test item 36 having an initial state of empty (block 44). The processor device 16 selects a logical path 26(0) of the one or more logical paths 26(0)-26(Y), 28(0)-28(Y') (block 46). In some examples, the processor device 16 may select the logical path 26(0) from among the one or more logical paths 26(0)-26(Y), 28(0)-28(Y') randomly.

The processor device 16 then translates the one or more test conditions 30(0)-30(Z) of the logical path 26(0) into a constraint 38 (block 48). Based on the constraint 38, the processor device 16 generates a pseudorandom test input 40 (block 50). The processor device 16 stores the pseudorandom test input 40 in association with the expected result 34(0) corresponding to the logical path 26(0) in the pseudorandom test item 36 (block 52).

Figure 3:
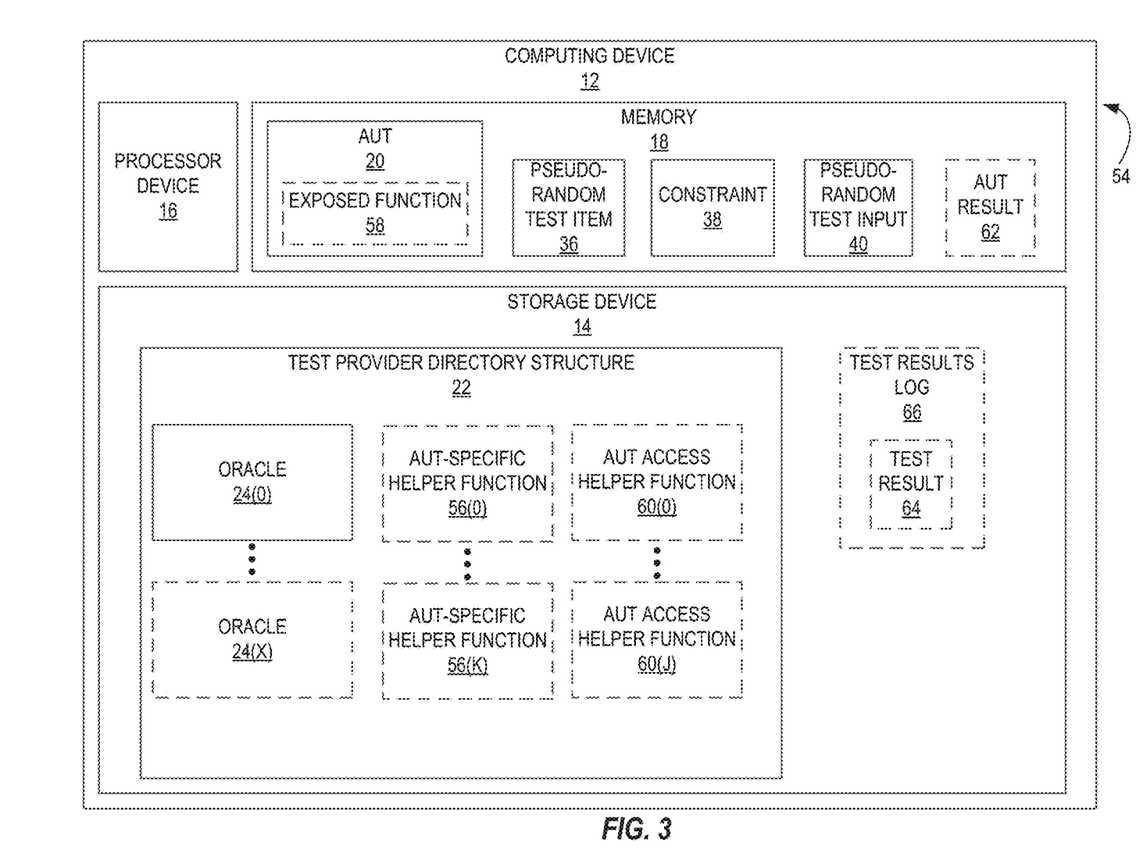
FIG. 3 is a block diagram of a system including additional elements, in which examples may be practiced.

FIG. 3 is a block diagram of a system 54 corresponding to the system 10 of FIG. 1, and including additional elements in which examples may be practiced. Elements of FIG. 3 that are common to FIG. 1 are numbered as in FIG. 1. As seen in FIG. 3, the test provider directory structure 22 in some examples may also include one or more AUT-specific helper functions 56(0)-56(K). Some examples may provide that the processor device 16 may perform the operations of block 50 of FIG. 2 for generating the pseudorandom test input 40 by invoking an AUT-specific helper function (e.g., the AUT-specific helper function 56(0)) of the one or more AUT-specific helper functions 56(0)-56(K). According to some examples, the AUT-specific helper functions 56(0)-56(K) may comprise executable code that may be invoked to produce the pseudorandom test input 40 in compliance with the specific requirements of the AUT 20. The use of the AUT-specific helper functions 56(0)-56(K) in some examples may enable the generation of the pseudorandom test input 40 for different AUTs 20.

According to some examples, the processor device 16 may perform further processing of the generated pseudorandom test item 36. The processor device 16 may submit the pseudorandom test input 40 of the pseudorandom test item 36 to the AUT 20. This may be accomplished in some examples by invoking an exposed function 58 of the AUT 20, such as a function defined by an Application Programming Interface (API) of the AUT 20. According to some examples, the pseudorandom test input 40 of the pseudorandom test item 36 may be submitted to the AUT 20 using one or more AUT access helper functions 60(0)-60(J) provided by the test provider directory structure 22. The AUT access helper functions 60(0)-60(J) in some examples may comprise executable code that may be invoked to provide an interface for submitting data to and/or receiving output from the AUT 20. For instance, the AUT access helper functions 60(0)-60(J) may instantiate an instance of the AUT 20, submit the pseudorandom test input 40 to the instantiated instance of the AUT 20 by simulating user input, and capture any output from the AUT 20 in response to the pseudorandom test input 40.

In response to the pseudorandom test input 40, the AUT 20 may generate an AUT result 62 that is received by the processor device 16. The AUT result 62 may comprise an error message, an error code, a status message, a status code, or the like, and may be formatted to be human-readable and/or machine-readable. The processor device 16 then compares the AUT result 62 received from the AUT 20 with the expected result (e.g., the expected result 34(0)) of the pseudorandom test item 36 to generate a test result 64. The test result 64 is then stored in a test results log 66.

In some examples, the test results log 66 may be used as the basis for generating new oracles 24(0)-24(X) for subsequent rounds of software testing. For instance, the test results log 66 may be used as a training set for a machine learning module (not illustrated) to define additional oracles 24(0)-24(X). The newly defined oracles 24(0)-24(X) may then be manually reviewed and validated by a quality control engineer, and used as input to the processor device 16 for further software testing of the AUT 20.

Figure 4A:
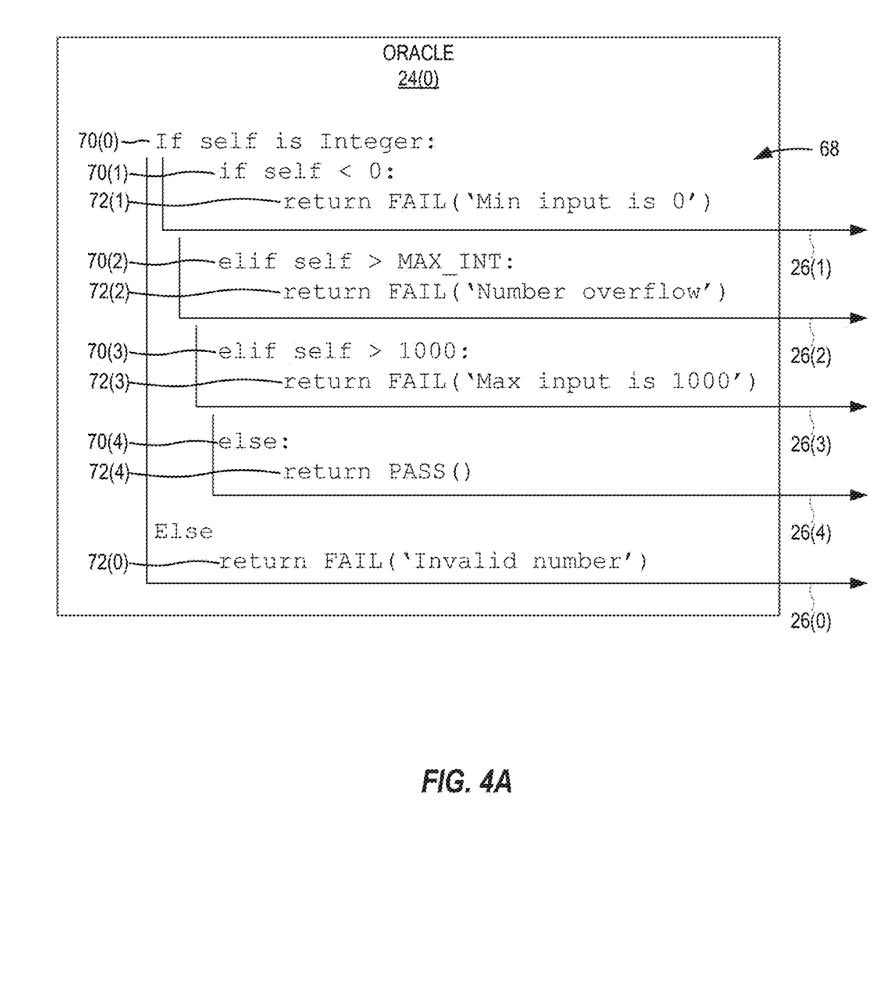
FIGS. 4A and 4B are block diagrams of an oracle of FIG. 1, and illustrate how logical paths, test conditions, and expected results therein are used to generate a constraint according to one example.
Figure 4B:
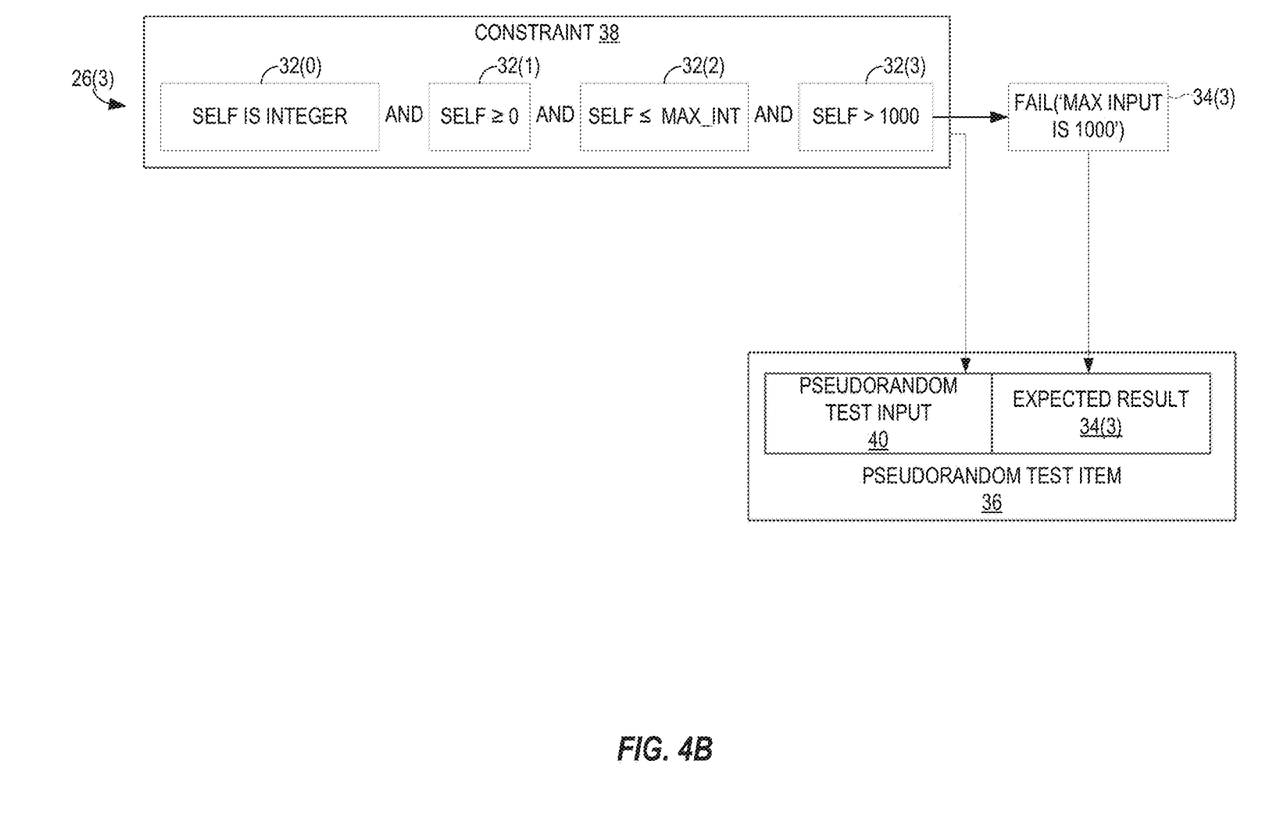

To illustrate the contents of an example oracle (e.g., the oracle 24(0) of FIGS. 1 and 3) and how they may be used to generate the constraint 38, FIGS. 4A and 4B are provided. As seen in FIG. 4A, the oracle 24(0) provides programming-language-like conditional syntax code 68. The conditional syntax code 68 includes conditional statements 70(0)-70(4) that use if and elif (else if) keywords to define the test conditions 30(0)-30(X) of FIG. 1. The conditional syntax code 68 also includes result statements 72(0)-72(4) that use a return keyword to define the expected results 34(0)-34(X) of FIG. 1. In this manner, the oracle 24(0) defines a series of logical paths 26(0)-26(4), each made up of all the test conditions 30(0)-30(4) required to reach a corresponding expected result 34(0)-34(4).

FIG. 4B illustrates how the constraint 38 may be generated using the definition of the logical path 26(3) provided by the oracle 24(0) in some examples. Assume that the processor device 16 has generated the random test item 36, and has selected the logical path 26(3) for use in populating the random test item 36. Referring back to FIG. 4A, in order to reach the result statement 72(3) that defines the expected result 34(3) of the logical path 26(3), the conditional statement 70(0) must evaluate to true, the conditional statements 70(1) and 70(2) must evaluate to false, and the conditional statement 70(3) must evaluate to true. These outcomes of the conditional statements 70(0)-70(3) are reflected by the test conditions 32(0)-32(3) shown in FIG. 4B for the logical path 26(3). Together, the test conditions 32(0)-32(3) are translated into the constraint 38.

The processor device 16 then generates the pseudorandom test input 40 by selecting a random or pseudorandom number that satisfies the constraint 38. For instance, in the example of FIG. 4B, the processor device 16 selects a random or pseudorandom number that is an integer (e.g., test condition 32(0)); is greater than zero (0) (e.g., test condition 32(1)); is less than a maximum integer value represented by MAX_INT (e.g., test condition 32(2)); and is greater than 1000 (e.g., test condition 32(3)). The pseudorandom test input 40 is then stored within the pseudorandom test item 36 along with the expected result 34(3) that corresponds to the test condition 32(3) used to generate the constraint 38.

Figure 5:
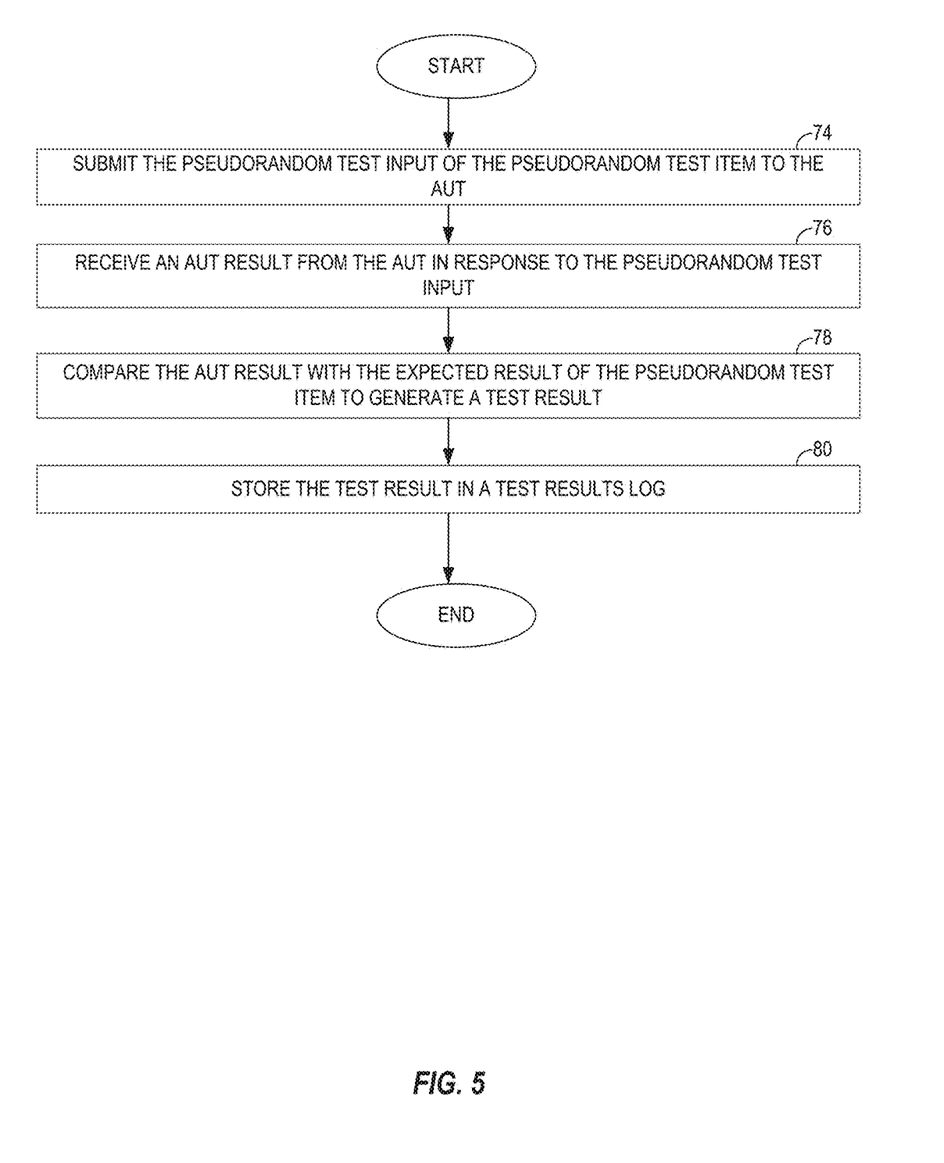
FIG. 5 is a flowchart illustrating additional operations for processing pseudorandom test items by the system of FIG. 3 according to one example.

FIG. 5 illustrates additional operations for processing generated pseudorandom test items 36 by the system 54 of FIG. 3 according to one example. Elements of FIG. 3 are referenced in describing FIG. 5, for the sake of clarity. In FIG. 5, operations may begin following the conclusion of the operations illustrated in FIG. 2, as the processor device 16 processes each generated pseudorandom test item 36. The processor device 16 submits the pseudorandom test input 40 of the pseudorandom test item 36 to the AUT 20 (block 74). According to some examples, the processor device 16 may submit the pseudorandom test input 40 to the AUT 20 by invoking an exposed function 58 of the AUT 20, and specifying the pseudorandom test input 40 as an input parameter of the exposed function 58. Some examples may provide that the processor device 16 may submit the pseudorandom test input 40 to the AUT 20 by invoking one or more of the AUT access helper functions 60(0)-60(J) of the test provider directory structure 22.

The processor device 16 then receives an AUT result 62 from the AUT 20 in response to the pseudorandom test input 40 (block 76). The AUT result 62 is compared with the expected result 34(0) of the pseudorandom test item 36 to generate a test result 64 (block 78). The processor device 16 stores the test result 64 in the test results log 66 (block 80).

Figure 6:
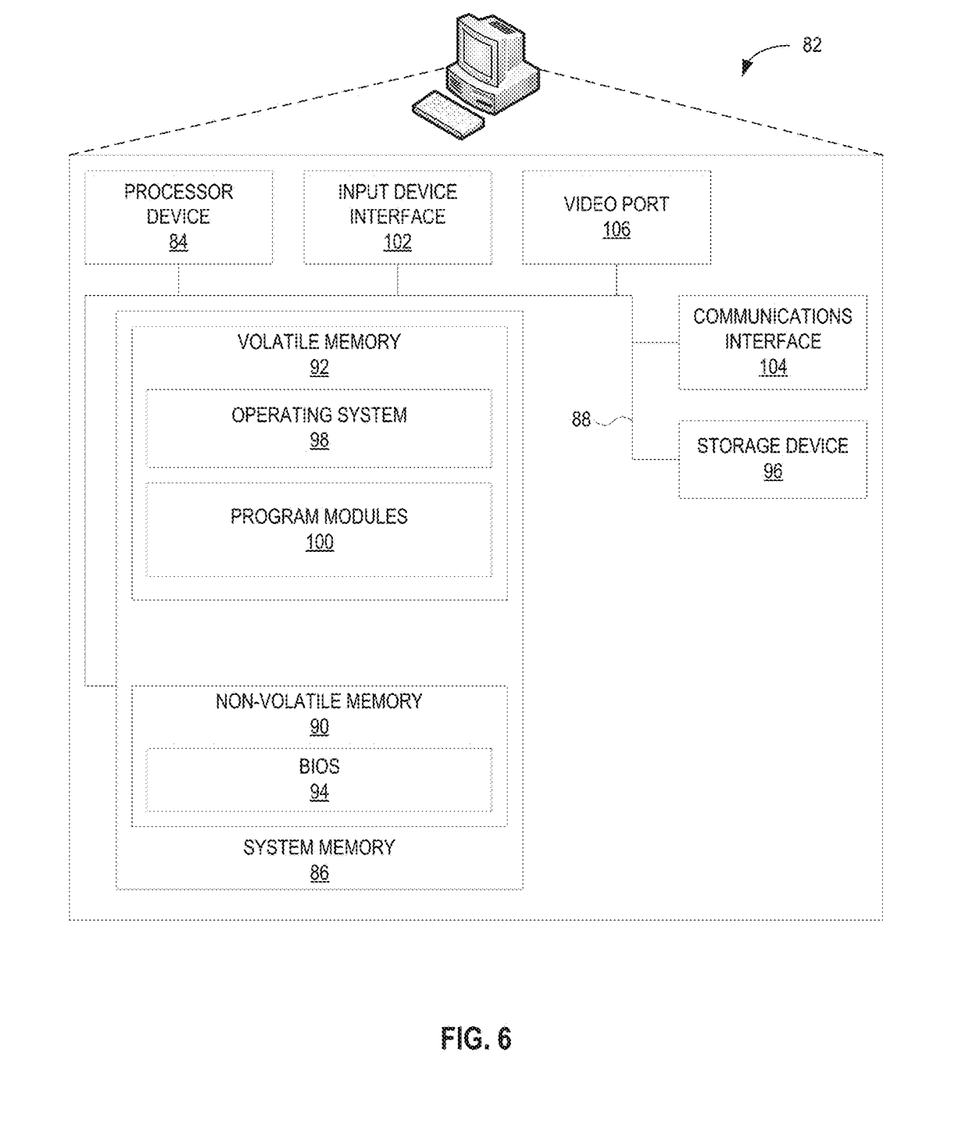
FIG. 6 is a block diagram of a computing device suitable for implementing examples according to one example.

FIG. 6 is a block diagram of a computing device 82 suitable for implementing examples according to one example. The computing device 82 may correspond to the computing device 12 of FIG. 1. The computing device 82 may comprise any computing or electronic device capable of including firmware, hardware, and/or executing software instructions to implement the functionality described herein, such as a computer server, a desktop computing device, a laptop computing device, a smartphone computing tablet, or the like. The computing device 82 includes a processor device 84, a system memory 86, and a system bus 88. The system bus 88 provides an interface for system components including, but not limited to, the system memory 86 and the processor device 84. The processor device 84 can be any commercially available or proprietary processor device.

The system bus 88 may be any of several types of bus structures that may further interconnect to a memory bus (with or without a memory controller), a peripheral bus, and/or a local bus using any of a variety of commercially available bus architectures. The system memory 86 may include non-volatile memory 90 (such as read-only memory (ROM), erasable programmable read-only memory (EPROM), and/or electrically erasable programmable read-only memory (EEPROM), as non-limiting examples), and volatile memory 92 (e.g., RAM, as a non-limiting example). A basic input/output system (BIOS) 94 may be stored in the non-volatile memory 90, and can include basic routines that help to transfer information between elements within the computing device 82. The volatile memory 92 may also include a high-speed RAM (not shown), such as static RAM, for caching data.

The computing device 82 may further include or be coupled to a non-transitory computer-readable storage medium such as a storage device 96. The storage device 96 may comprise, as non-limiting examples, an internal or external HDD (e.g., enhanced integrated drive electronics (EIDE) or serial advanced technology attachment (SATA)), HDD (e.g., EIDE or SATA) for storage, flash memory, or the like. The storage device 96 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 96 and in the volatile memory 92, including an operating system 98 and one or more program modules 100, which may implement the functionality described herein in whole or in part. It is to be appreciated that the examples can be implemented with various commercially available operating systems 98 or combinations of operating systems 98.

A number of modules can be stored in the storage device 96 and in the volatile memory 92, including, by way of non-limiting example, the processor device 16 of FIG. 1. All or a portion of the examples may be implemented as a computer program product stored on a transitory or non-transitory computer-usable or computer-readable storage medium, such as the storage device 96, which includes complex programming instructions, such as complex computer-readable program code, to cause the processor device 84 to carry out the operations described herein. Thus, the computer-readable program code can comprise software instructions for implementing the functionality of the examples described herein when executed on the processor device 84. The processor device 84 may serve as a controller, or control system, for the computing device 82 that is to implement the functionality described herein.

An operator, such as a user (not illustrated), may also be able to enter one or more configuration commands through a keyboard (not illustrated), a pointing device such as a mouse (not illustrated), or a touch-sensitive surface (not illustrated). Such input devices may be connected to the processor device 84 through an input device interface 102 that is coupled to the system bus 88 but can be connected by other interfaces such as a parallel port, an Institute of Electrical and Electronic Engineers (IEEE) 1394 serial port, a Universal Serial Bus (USB) port, an IR interface, and/or the like.

The computing device 82 may also include a communications interface 104 suitable for communicating with a network (not illustrated) as appropriate or desired. The computing device 82 may also include a video port 106 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method for generating pseudorandom test items for software testing of an Application Under Test (AUT), comprising:
    selecting, by a computing device comprising a processor device, an oracle of one or more oracles within a test provider directory structure, the oracle defining one or more logical paths each comprising one or more test conditions and an expected result;
    generating a pseudorandom test item having an initial state of empty;
    selecting a logical path of the one or more logical paths;
    translating the one or more test conditions of the logical path into a constraint;
    generating, based on the constraint, a pseudorandom test input; and
    storing the pseudorandom test input in association with the expected result of the logical path in the pseudorandom test item.

2. The method of claim 1, further comprising:
    submitting the pseudorandom test input of the pseudorandom test item to the AUT;
    receiving an AUT result from the AUT in response to the pseudorandom test input;
    comparing the AUT result with the expected result of the pseudorandom test item to generate a test result; and
    storing the test result in a test results log.

3. The method of claim 2, wherein submitting the pseudorandom test input of the pseudorandom test item to the AUT comprises invoking an exposed function of the AUT specifying the pseudorandom test input as an input parameter of the exposed function.

4. The method of claim 2, wherein submitting the pseudorandom test input of the pseudorandom test item to the AUT comprises invoking an AUT access helper function of one or more AUT access helper functions of the test provider directory structure.

5. The method of claim 1, wherein selecting the logical path of the one or more logical paths comprises selecting the logical path of the one or more logical paths randomly.

6. The method of claim 1, wherein generating the pseudorandom test item having the initial state of empty comprises invoking an AUT-specific helper function of one or more AUT-specific helper functions of the test provider directory structure.

7. The method of claim 1, wherein selecting the oracle of the one or more oracles is responsive to the expected result of a pseudorandom test item for a previously processed oracle of the one or more oracles.

8. A computing device, comprising:
a memory; and
a processor device coupled to the memory to:
select an oracle of one or more oracles within a test provider directory structure, the oracle defining one or more logical paths each comprising one or more test conditions and an expected result for generating pseudorandom test items for software testing of an Application Under Test (AUT);
generate a pseudorandom test item having an initial state of empty;
select a logical path of the one or more logical paths;
translate the one or more test conditions of the logical path into a constraint;
generate, based on the constraint, a pseudorandom test input; and
store the pseudorandom test input in association with the expected result of the logical path in the pseudorandom test item.

9. The computing device of claim 8, wherein the processor device is further to:
submit the pseudorandom test input of the pseudorandom test item to the AUT;
receive an AUT result from the AUT in response to the pseudorandom test input;
compare the AUT result with the expected result of the pseudorandom test item to generate a test result; and
store the test result in a test results log.

10. The computing device of claim 9, wherein the processor device is to submit the pseudorandom test input of the pseudorandom test item to the AUT by invoking an exposed function of the AUT specifying the pseudorandom test input as an input parameter of the exposed function.

11. The computing device of claim 9, wherein the processor device is to submit the pseudorandom test input of the pseudorandom test item to the AUT by invoking an AUT access helper function of one or more AUT access helper functions of the test provider directory structure.

12. The computing device of claim 8, wherein the processor device is to select the logical path of the one or more logical paths randomly.

13. The computing device of claim 8, wherein the processor device is to generate the pseudorandom test item having the initial state of empty by invoking an AUT-specific helper function of one or more AUT-specific helper functions of the test provider directory structure.

14. The computing device of claim 8, wherein the processor device is to select the oracle of the one or more oracles responsive to the expected result of a pseudorandom test item for a previously processed oracle of the one or more oracles.

15. A computer program product for generating pseudorandom test items for software testing of an Application Under Test (AUT), the computer program product stored on a non-transitory computer-readable storage medium and including instructions to cause a processor device to:
select an oracle of one or more oracles within a test provider directory structure, the oracle defining one or more logical paths each comprising one or more test conditions and an expected result;
generate a pseudorandom test item having an initial state of empty;
select a logical path of the one or more logical paths;
translate the one or more test conditions of the logical path into a constraint;
generate, based on the constraint, a pseudorandom test input; and
store the pseudorandom test input in association with the expected result of the logical path in the pseudorandom test item.

16. The computer program product of claim 15, including instructions to cause the processor device further to:
submit the pseudorandom test input of the pseudorandom test item to the AUT;
receive an AUT result from the AUT in response to the pseudorandom test input;
compare the AUT result with the expected result of the pseudorandom test item to generate a test result; and
store the test result in a test results log.

17. The computer program product of claim 16, wherein the instructions to cause the processor device to submit the pseudorandom test input of the pseudorandom test item to the AUT comprise instructions to cause the processor device to invoke an exposed function of the AUT specifying the pseudorandom test input as an input parameter of the exposed function.

18. The computer program product of claim 16, wherein the instructions to cause the processor device to submit the pseudorandom test input of the pseudorandom test item to the AUT comprise instructions to cause the processor device to invoke an AUT access helper function of one or more AUT access helper functions of the test provider directory structure.

19. The computer program product of claim 15, wherein the instructions to cause the processor device to select the logical path of the one or more logical paths comprise instructions to cause the processor device to select the logical path of the one or more logical paths randomly.

20. The computer program product of claim 15, wherein the instructions to cause the processor device to generate the pseudorandom test item having the initial state of empty comprise instructions to cause the processor device to invoke an AUT-specific helper function of one or more AUT-specific helper functions of the test provider directory structure.

21. The method of claim 1 wherein the one or more test conditions comprise conditional statements that evaluate to a true state or a false state based on a value of the pseudorandom test input.

* * * * *